United States Patent
Niaf et al.

(10) Patent No.: US 11,455,825 B2
(45) Date of Patent: Sep. 27, 2022

(54) METHOD AND DEVICE FOR SELECTING A FINGERPRINT IMAGE IN A SEQUENCE OF IMAGES FOR AUTHENTICATION OR IDENTIFICATION

(71) Applicant: IDEMIA IDENTITY & SECURITY FRANCE, Courbevoie (FR)

(72) Inventors: Emilie Niaf, Courbevoie (FR); Guy Mabyalaht, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/531,042

(22) Filed: Nov. 19, 2021

(65) Prior Publication Data
US 2022/0180087 A1   Jun. 9, 2022

(30) Foreign Application Priority Data
Dec. 9, 2020   (FR) ........................... 2012931

(51) Int. Cl.
*G06V 40/12* (2022.01)
*G06V 40/13* (2022.01)
*G06V 10/98* (2022.01)

(52) U.S. Cl.
CPC ........ *G06V 40/1347* (2022.01); *G06V 10/993* (2022.01); *G06V 40/13* (2022.01)

(58) Field of Classification Search
CPC .. G06V 40/1347; G06V 10/993; G06V 40/13; G06V 10/809; G06V 40/1365; G06F 21/32
See application file for complete search history.

(56) References Cited

U.S. PATENT DOCUMENTS

| 2018/0107862 A1* | 4/2018 | Zhang | G06V 40/1347 |
| 2019/0087636 A1* | 3/2019 | Wang | G06V 10/993 |
| 2019/0138703 A1* | 5/2019 | Zhou | G06V 40/1365 |

FOREIGN PATENT DOCUMENTS

FR   3084943 A1   2/2020

OTHER PUBLICATIONS

Aug. 11, 2021 Search Report issued in French Patent Application No. 2012931.

* cited by examiner

*Primary Examiner* — Jonathan A Boyd
(74) *Attorney, Agent, or Firm* — Oliff PLC

(57) ABSTRACT

A method for selecting an image of a fingerprint for identifying an individual is described. The method includes: acquiring a current image comprising a fingerprint and segmenting said fingerprint; determining a value representing a stability of said current image; determining a value representing the sharpness of said current image; determining a score, said score being a combination of said value representing a stability, of said value representing a sharpness and of a number of segmented fingerprints; and selecting said current image for identifying said individual in the case where said score is higher than a first threshold value, and otherwise storing said current image in memory as best image in the case where the score thereof is higher than a best score value, and repeating this method.

11 Claims, 3 Drawing Sheets

METHOD AND DEVICE FOR SELECTING A FINGERPRINT IMAGE IN A SEQUENCE OF IMAGES FOR AUTHENTICATION OR IDENTIFICATION

TECHNICAL FIELD

The invention relates to a method and device for selecting an image of a fingerprint for identifying or authenticating an individual. The image is more particularly selected from a sequence of images acquired by an image capture device.

PRIOR ART

The use of fingerprints, for example of the type consisting of a print of a finger or of a plurality of fingers, makes it possible to secure access to buildings or to machines. Using this technology makes it possible to reinforce security since the probability of two persons having two identical fingerprints is almost zero.

A system for capturing fingerprints makes it possible to obtain at least one image of at least one fingerprint. In the case of an identification, each print is compared with a set of reference fingerprints contained in a database. In the case of an authentication, each print is compared with a single fingerprint. The comparison makes it possible to determine whether each fingerprint obtained belongs or not to a person referenced in the database or whether the person is indeed the one that they claim to be.

For this purpose, using mobile equipment, e.g. a smartphone, in order to capture one or more fingerprints of an individual in order to identify or authenticate them is known. A print capture system can be added to the mobile equipment when it is manufactured. Such a system for capturing prints on a smartphone often has an acquisition surface less than the size of the print. It therefore requires the use of adapted image mosaicing algorithms in order to reconstruct the print in its entirety. Such a solution is therefore expensive to implement. The majority of such mobile equipment being equipped with a colour camera, the document of Lee et al entitled "*Image Preprocessing of Fingerprint Images Captured with a Mobile Camera*" published in 2006, in ICB ("International Conference on Advances in Biometrics") suggests using this camera directly for developing a print recognition system.

However, such an approach poses numerous problems compared with the conventional print capture systems. In particular, the backgrounds of the images of a finger or fingers captured are highly variable (e.g. ground, landscapes, etc.). The quality of the images acquired is also very variable from one item of mobile equipment to another.

It is desirable to overcome these drawbacks of the prior art. It is in particular desirable to propose a method and a device that make it possible to use any type of image sensor present on the consumer mobile equipment in order to acquire at least one good-quality fingerprint in a sequence of images. Moreover, this method must be quick to implement and use little memory.

DISCLOSURE OF THE INVENTION

A method for selecting an image of a fingerprint for identifying or authenticating an individual is described. The image being selected in a sequence of images acquired by an image capture module, the method comprises:

a) acquiring an image, referred to as the current image, comprising at least one fingerprint with said image capture module and segmenting said at least one fingerprint;

b) determining a value representing a stability of said current image from said at least one segmented fingerprint;

c) determining a value representing the sharpness of said current image from said at least one segmented fingerprint;

d) determining a score for said current image, said score being a combination of said value representing a stability, of said value representing a sharpness and of a number of segmented fingerprints in said current image;

e) selecting said current image for identifying or authenticating said individual in the case where said score is higher than a first threshold value, and otherwise storing said current image in memory as best image in the case where the score thereof is higher than a best score value, said best score value then being made equal to the score of said current image, and repeating steps a) to e).

The method described advantageously makes it possible to accelerate control of access to buildings, e.g. to stadiums, in order in particular to combat fraud. This is because the method improves the precision of identification and authentication and reduces the acquisition time with a negligible increase in the computing time.

According to a particular embodiment, determining a value representing a stability of said current image from said at least one segmented fingerprint comprises:

for each segmented fingerprint, said fingerprint being segmented in the form of a region, referred to as the current region:

determining a centre of gravity of said current region;

determining a stability value of said current region according to a criterion of spatial proximity between said current region and determined regions in f images preceding said current image timewise;

determining a mean value of said determined stability values, said value representing a stability of said current image being equal to said mean value determined.

According to a particular embodiment, determining a stability value of said current region comprises:

determining a distance between the centre of gravity of said current region and the centre of gravity of at least one determined region in one of the f images preceding said current image timewise, referred to as the preceding region, with which a label is associated;

associating said label with said current region in the case where said distance is smaller than a second threshold value; and associating a new label with said current region otherwise;

determining the percentage of occurrences in F images preceding said current image of said label, said stability value of said current region being equal to said percentage.

According to a variant embodiment, determining a stability value of said current region comprises:

determining a distance between the centre of gravity of said current region and the centre of gravity of at least one determined region in one of the f images preceding said current image timewise, referred to as the preceding region, with which a label is associated;

determining a first directing vector of said current region and a second directing vector of said preceding region;

associating said label with said current region in the case where said distance is less than a second threshold value and a scalar product of said first directing vector and of said second directing vector is higher than a third threshold value;

associating a new label with said current region otherwise;

determining the percentage of occurrences in F images preceding said current image of said label, said stability value of said current region being equal to said percentage.

According to a particular feature, f=0.2*fps and F=0.8*fps where fps is the number of images per second.

According to a particular embodiment, determining a value representing the sharpness of said current image from said at least one segmented fingerprint comprises:

determining gradients in said current image;

for each segmented fingerprint, said fingerprint being segmented in the form of a region, determining a sum of the magnitudes of the gradients inside said region;

determining a mean value of said sums determined, said value representing the sharpness of said current image being equal to said mean value determined.

According to a particular embodiment, each region is eroded prior to said determination of a sum of the magnitudes of the gradients and said determination of a sum of the magnitudes of the gradients comprises determining a sum of the magnitudes of the gradients inside said eroded region.

According to a particular embodiment, said score for said current image is determined according to the following formula:

$$\text{Score}(Im_t)=\min(TH1,\text{Stability}(Im_t))*\min(TH2,\text{Sharpness}(Im_t))*\min(TH3,Nt)$$

where TH1, TH2 and TH3 are threshold values, Stability ($Im_t$) is the stability value of said current image, Sharpness (Imt) is the sharpness value of said current image and Nt is the number of segmented fingerprints in said current image.

According to a particular embodiment, the step e) further comprises updating said best score value of said image stored in memory as best image taking account of the value representing the stability of said current image;

and selecting said image stored in memory as best image for identifying and authenticating said individual in the case where said updated best score value is higher than said first threshold value and than said score of said current image.

According to a particular embodiment, updating said best score value of said image stored in memory as best image taking account of the value representing the stability of said current image comprises, for each region that said best image shares with said current image, replacing the stability associated with said region in said best image with the stability associated with said region in said current image in the case where the stability associated with said region in said current image is greater than the stability associated with said region in said best image and updating said best score value of said best image taking account of said replaced stabilities.

A device for selecting an image of a fingerprint for identifying or authenticating an individual is also described. The selection device comprises an image capture module, said image being selected in a sequence of images acquired by said image capture module. The selection device comprises electronic circuitry configured for:

a) acquiring an image, referred to as the current image, comprising at least one fingerprint with said image capture module and segmenting said at least one fingerprint;

b) determining a value representing a stability of said current image from said at least one segmented fingerprint;

c) determining a value representing the sharpness of said current image from said at least one segmented fingerprint;

d) determining a score for said current image, said score being a combination of said value representing a stability, of said value representing a sharpness and of a number of segmented fingerprints in said current image;

e) selecting said current image for identifying or authenticating said individual in the case where said score is higher than a first threshold value, and otherwise storing said current image in memory as the best image in the case where the score thereof is higher than a best score value, said best score value then being made equal to the score of said current image, and repeating steps a) to e).

A computer program product is described. It comprises instructions for implementing, by a device for selecting an image, the method according to one of the preceding embodiments, when said program is executed by a processor of said device for selecting an image.

A storage medium is described. It stores a computer program comprising instructions for implementing, by a device for selecting an image, the method according to one of the preceding embodiments, when said program is executed by a processor of said device for selecting an image.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
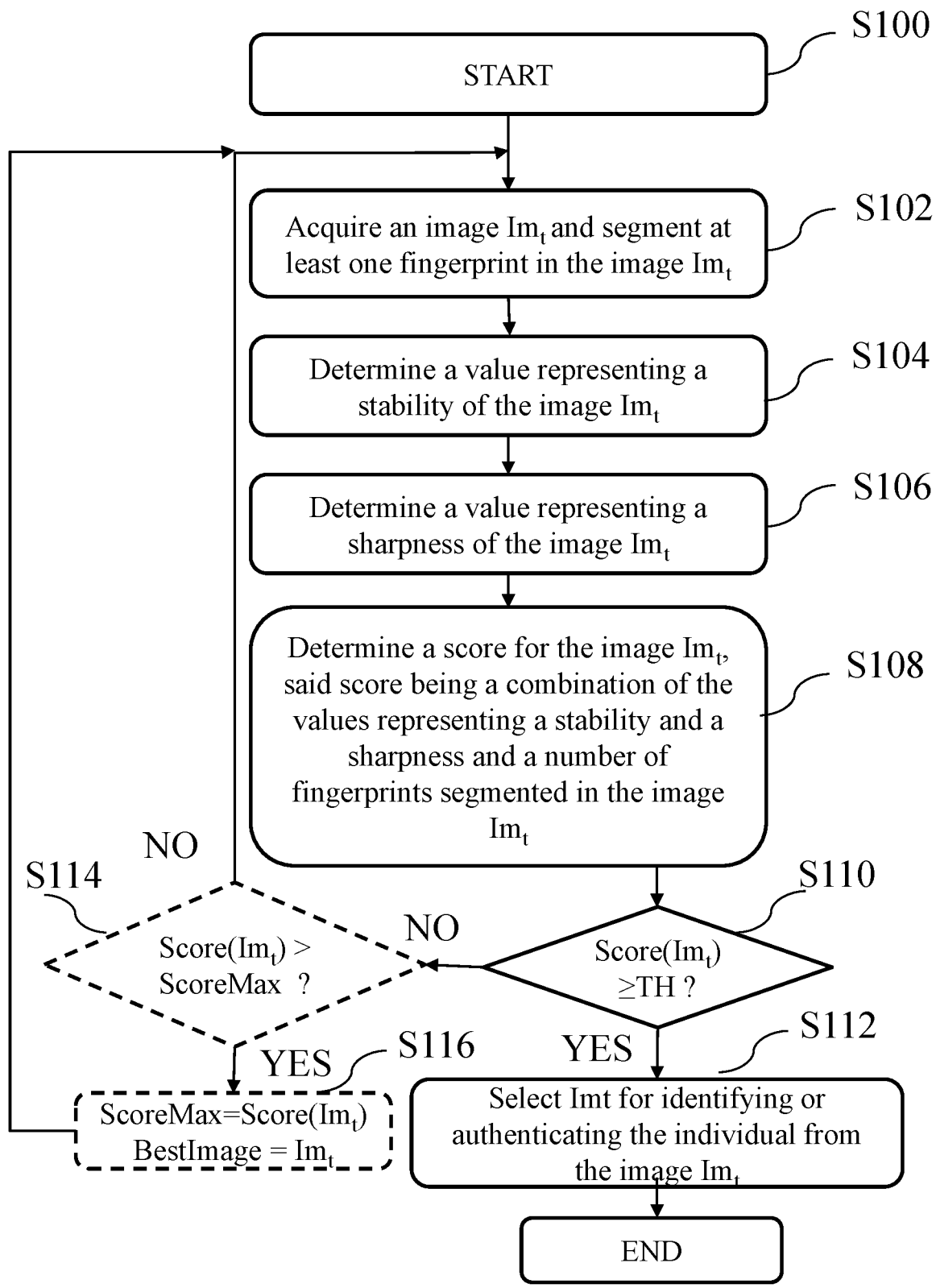
FIG. 1 illustrates schematically a method for selecting an image of a fingerprint for identifying or authenticating an individual according to a particular embodiment.

FIG. 1 illustrates schematically a method for selecting an image of a fingerprint for identifying or authenticating an individual, said image being selected from a sequence of images acquired by an image capture device according to a particular embodiment. The image capture device is advantageously a camera of an item of consumer mobile equipment, e.g. a smartphone, a tablet, a fixed or portable computer, etc. Hereinafter, the terms «print» and "fingerprint" are considered to be synonyms.

The method starts at the step S100, at an instant t. During a step S102, an image $Im_t$ comprising at least one fingerprint of the individual is acquired with an image sensor. The individual positions their hand in front of the sensor so that these prints are visible, the hand being stationary or in movement. At least one fingerprint is segmented in the image $Im_t$ in the form of a region $ROI_n$, n is an index serving to identify the region. In general, Nt fingerprints are segmented in said image with Nt between 1 and 5.

By way of simple illustrative examples, the finger segmentation method described in the document of Lee et al entitled "Preprocessing of a Fingerprint Image Captured with a Mobile Camera", published in 2006 in International Conference on Biometrics (ICB) 348-355, makes it possible to obtain segmented fingerprints. The method described in the document of Suzuki et al entitled "Topological structural analysis of digitized binary images by border following" published in 1985 in Computer Vision, Graphics, and Image Processing, 30(1):32-46, makes it possible to obtain contours of fingerprints from segmented fingerprints. The method described in the document by Ramer et al entitled "*An iterative procedure for the polygonal approximation of plane curves*" published in 1972 in Computer Graphics and Image Processing, 1(3), 244-256, makes it possible to obtain polygons from said fingerprint contours.

It should however be noted that the embodiments described are not limited solely to this finger segmentation method. Other methods can be used. Thus segmentation methods based on deformable models using parametric curves (e.g. first-degree splines) can be used.

Each region $ROI_n$, with n varying from 0 to Nt−1, is for example identified by means of a convex polygon with m vertices (xi, yi) with m integer and (xi, yi) are the coordinates of a vertex of index i, i varying from 0 to m, with x0=xm and y0=ym. The vertices corresponding to the edge of the image or to the cutting line separating the fingerprint from the intermediate phalanx are identified with a specific label during the segmentation step.

In a step S104, a value representing a stability of the image $Im_t$ is determined. A particular embodiment of the step S104 is illustrated schematically by FIG. 2.

In a step S106, a value representing a sharpness of the image $Im_t$ is determined. A particular embodiment of the step S106 is illustrated schematically by FIG. 4.

In a step S108, a score is determined for the image $Im_t$, the score being a combination of the values representing the stability and sharpness of the number Nt of segmented fingerprints in the image $Im_t$. The score represents the quality of the image. The higher the score, the higher the quality of the image and therefore better will be an identification/authentication made from this image. In one embodiment, the score $Score(Im_t)$ associated with the image $Im_t$ is calculated as follows:

$$Score(Im_t) = fct(Stability(Im_t))*g(Sharpness(Im_t))*h(Nt)$$

where fct, g and h are functions. For example, fct, g and h are identical and are equal to the identity function. In a variant, $fct(Stability(Im_t))=min(THS, Stability(Im_t))$, $g(Sharpness(Im_t))=min(THN, Sharpness(Im_t))$ and $h(Nt)=min(THNt, Nt)$ where THS, THN and THNt are predefined threshold values. For example, THS=0.67, THN=1500 and THNt=2

In a step S110, the score $Score(Im_t)$ is compared with a threshold value TH. For example, TH=THS*THN*THNt. The value TH is fixed according to a compromise between image quality and speed of execution of the method. If the score associated with the image $Im_t$ is higher than or equal to TH, then the image is considered to be of sufficiently good quality to be selected during a step S112 for the purpose of identifying/authenticating the individual to which it belongs. In the contrary case, i.e. $Score(Im_t)<TH$, the method resumes at the step S102 and a new image is acquired.

In an optional variant embodiment, at each iteration, the best image acquired up until now, i.e. the one with the highest score, is stored in memory. Thus, if $Score(Im_t)<TH$, the score $Score(Im_t)$ is, in a step S114, compared with the highest score obtained up until now and denoted ScoreMax.

If $Score(Im_t)>ScoreMax$ then, in a step S116, ScoreMax is made equal to $Score(Im_t)$ and $Im_t$ is stored in memory as being the best image, denoted BestImage for an identification/authentication. Where applicable, the image previously stored as being the best image is therefore deleted. In another optional variant embodiment, at each new iteration, the stability and therefore the score of the image BestImage is updated taking account of information on the stability coming from images acquired subsequently to the best image.

This is because the concept of stability unduly penalises certain potentially sharp images with correctly segmented fingerprints. For example, in a series of n perfectly stable images $Im_t$, $Im_{t+1}$, . . . $Im_{t+n}$, for an equal number of segmented fingerprints and an equal measurement of sharpness, the score of the last image $Score(Im_{t+n})$ is higher than $Score(Im_t)$ since the value representing a stability is higher for the image $Im_{t+n}$ than for the image $Im_t$. However, these are the same images. Updating the score of the best image at each iteration taking account of information on the stability coming from images acquired subsequently to the best image makes it possible to compensate for this effect. Take a sequence of images $Im_0$, $Im_1$, . . . $Im_{t'}$, . . . , $Im_t$ acquired by the image sensor. Let $Im_{t'}$ be the best current image that was acquired at the instant t'. Its stability value is updated taking account of the information on the stability of images acquired subsequently to t'. The score of $Im_{t'}$ after the updating, is once again compared with TH. If the updated score is higher than TH, then the method continues at the step S112 with $Im_{t'}$. This approach makes it possible to reduce the mean time for selecting an image for identification/authentication since the updated score $Score(Im_{t'})$ is potentially higher than before the updating and may equal or exceed the threshold TH.

In a particular embodiment, the updating of the stability and therefore of the score of the image $Im_{t'}$, (the current best image) is performed even in the case where the score associated with the image $Im_t$ is higher than or equal to TH. This is because it is possible that, following this updating, the score of the image $Im_{t'}$ is in the end higher than the score of the image $Im_t$ and therefore than TH. In this case, it is preferable to select the image $Im_{t'}$ that is of better quality than the image $Im_t$.

In another particular embodiment, an additional stop criterion is used during the step S110. If the number of images acquired is greater than a threshold value then BestImage is selected for identifying or authenticating the individual. Thus, after a certain acquisition time, if no image has been found with a Score higher than TH, the best image that is stored in memory is used.

Figure 2:
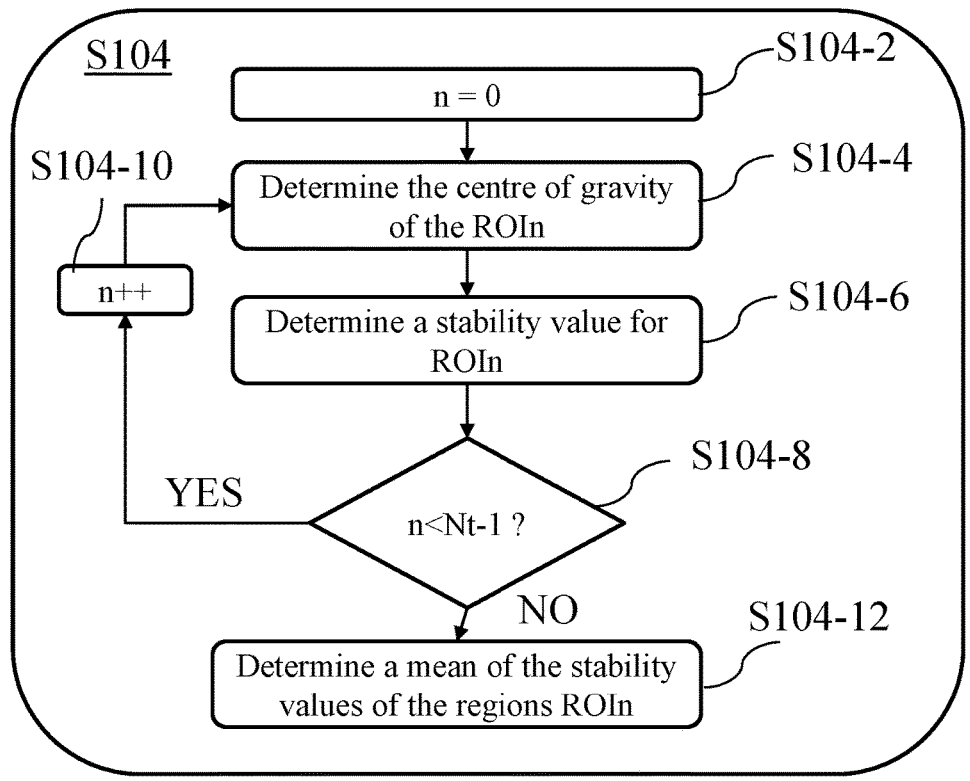
FIG. 2 illustrates schematically an example of performance of a step of determining a value representing a stability of an image according to a particular embodiment.

FIG. 2 illustrates schematically an example of performance of the step S104.

The step S104 starts (S104-2) with n=0. This is a simple convention.

During a step S104-4, the centre of gravity of the region $ROI_n$ is determined. The coordinates (cx, cy) of the centre of gravity are for example determined as follows:

$$c_x = \frac{1}{6*A} \sum_{i=0}^{m-1} (x_i + x_{i+1}) * (x_i * y_{i+1} - x_{i+1} * y_i)$$

$$c_y = \frac{1}{6*A} \sum_{i=0}^{m-1} (y_i + y_{i+1}) * (x_i * y_{i+1} - x_{i+1} * y_i)$$

where: $A=\frac{1}{2}\sum_{i=0}^{m-1}(x_i*y_{i+1}-x_{i+1}*y_i)$, xm=x0 and ym=y0.

In a step S104-6, a stability value is determined for the region $ROI_n$. The stability value for the region $ROI_n$ of the image $Im_t$ is equal to a percentage of occurrences, in F images preceding the image $Im_t$, of a label that is associated therewith, F being a positive integer representing a number of images. F is proportional to the image frequency fps, e.g. F=0.8*fps. For example, F=20 when fps is equal to 25 images per second.

For this purpose, the region $ROI_n$ is compared with segmented regions $ROI_p$ in f images $Im_{t'}$ that precede it, f being a positive integer representing a number of images, e.g. f=5 for a frequency of 25 images per second. More generally, f is proportional to the image frequency, e.g. f=0.2*fps. The objective of this step is to associate, with the region $ROI_n$, a label of a region already labelled previously taking account of a spatial proximity criterion or where applicable associating a new label in the case where this spatial proximity criterion is not satisfied with any region of the preceding images.

Figure 3:
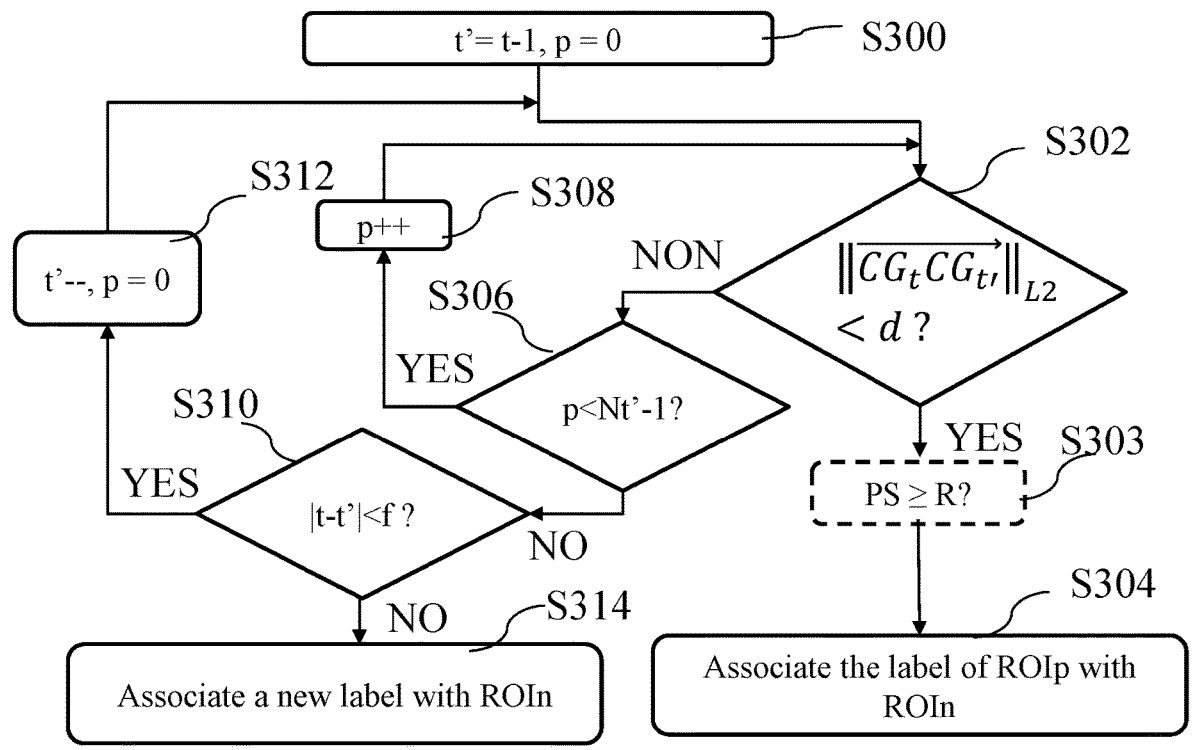
FIG. 3 illustrates schematically a method for associating regions with each other according to a particular embodiment.

This step is illustrated in FIG. 3. The value t' is initialised (S300) to the value t−1 and p to the value 0.

In a step S302, a spatial distance between the regions $ROI_n$ and $ROI_p$ is compared with a threshold d. By way of example, the spatial distance is equal to the Euclidean distance $\|\overrightarrow{CG_{n,t}CG_{p,t'}}\|_{L2}$ where $CG_{n,t}$ is the centre of gravity of the region $ROI_n$ in the image $Im_t$ and $CG_{p,t'}$ is the centre of gravity of the region $ROI_p$ in the image $Im_{t'}$ preceding the image $Im_t$. Other distances can be used.

For example, d=100 for images of size 2000×2000 pixels. This proximity criterion makes it possible to verify that the region $ROI_n$ has not drifted excessively between the instant t' and the instant t.

If $\|\overrightarrow{CG_{n,t}CG_{p,t'}}\|_{L2}$<d then the region $ROI_n$ the image $Im_t$ is associated with the region $ROI_p$ in the image $Im_{t'}$, i.e. the label $ROI_p$ is associated with $ROI_n$ (step S304). The region $ROI_p$ will, where applicable, have been associated with a region $ROI_q$ in an image $In_{t''}$ that precedes Imt'. All the regions thus associated with each other will have the same label, a label being created at the time of the first occurrence.

In a particular embodiment, if $\|\overrightarrow{CG_{n,t}CG_{p,t'}}\|_{L2}$<d, the orientation of the region $ROI_n$ in the image $Im_t$ is compared with the orientation of the region $ROI_p$ in the image $Im_{t'}$. For this purpose, a directing vector is determined for each of the two regions. This directing vector is defined by the centre of gravity of the region and the central point of the cutting line defining the bottom of the region during the segmentation step. In the case where the scalar product PS of the two directing vectors is above a predetermined threshold R (step S303), the region $ROI_n$ in the image $Im_t$ is associated with the region $ROI_p$ in the image $Im_{t'}$, i.e. the label of $ROI_p$ is associated with $ROI_n$. If the scalar product is less than R, then the two regions are not associated. For example R≥0 will be selected, or according to another example R≥0.5. For example, when R=0, if the scalar product is positive or zero, the region $ROI_n$ in the image $Im_t$ is associated with the region $ROI_p$ in the image $Im_{t'}$, i.e. the label of $ROI_p$ is associated with $ROI_n$. If the scalar product is negative, then the two regions are not associated. This has in particular the effect of eliminating any false detections of objects located in the background.

If $\|\overrightarrow{CG_{n,t}CG_{p,t'}}\|_{L2}$≥d, the region $ROI_n$ is compared with another region of the image $Im_{t'}$, if an untested one still exists up to the present time. Thus, if p<Nt'−1 (step S306), then p is incremented by 1 (step S308) and the method resumes at the step S302 with the new region $ROI_p$ of the image $Im_{t'}$.

Otherwise, i.e. if p≥Nt'−1 (step S306), then if |t−t'|<f (step S310), the value t' is decremented by 1 and p is set to 0 (step S312). The method resumes at the step S302 with the new region $ROI_p$ in the new image $Im_{t'}$. Otherwise, i.e. if |t−t'|≥f (step S310), the method continues at the step S314. At the step S314, a new label is created and associated with the region $ROI_n$ with which regions in images that follow $Im_t$ will be able to be associated. This is because in this case no segmented region in the f images that precedes it is close within the meaning of the predefined criterion of the region $ROI_n$ of the image $Im_t$. In a particular embodiment, a Hungarian method is used for guaranteeing that a plurality of $ROI_n$ regions of the current image are not associated with an $ROI_p$ of a preceding image and vice versa, and that these associations are optimum in the sense of the distance between centres of gravity. The document by Kuhn entitled "*The Hungarian method for the assignment problem*" and published in 1955 in Naval Research Logistics Quarterly, 2: 83-97, describes this method, which makes it possible to find an optimum coupling of maximum (and respectively minimum) weight in a bipartite graph the edges of which are valued.

The stability value $S_n$ for the region $ROI_n$ of the image $Im_t$ is equal to a percentage of occurrences, in F images preceding the image $Im_t$, of the label that is associated therewith. Thus, for the region $ROI_n$ of $Im_t$, $$S_n = \frac{Nb\_occurrence}{F}$$

where Nb_occurrence is the number of times when the label associated with $ROI_n$ is associated with a region in the F images that precede $Im_t$.

Returning to FIG. 2, in a step S104-8, n is compared with Nt−1. If n<Nt−1, n is incremented by 1 in a step S104-10. Otherwise the method continues at the step S104-12. During the step S104-12, a value representing a stability of the image $Im_t$ is determined. It is equal to the mean of the stability values of the $ROI_n$ regions of the image:

$$S = \frac{1}{Nt}\sum_{n=0}^{Nt-1} S_n \qquad (Eq.\ 1)$$

In the variant embodiment wherein, at each new iteration, the stability and therefore the score of the image BestImage is updated taking account of information on the stability coming from images acquired subsequently to the best image, and the stability value is updated taking account of the occurrences of the tags associated with its regions in the following images. For this purpose, if the stability of a region $ROI_m$ in the image $Im_t$ is lower than the stability of the region $ROI_p$ in the image $Im_{t'}$, the region $ROI_p$ in the image $Im_t$ having the same label as the region $ROI_m$ in the image $Im_{t'}$, the stability associated with the region $ROI_m$ in the image $Im_t$ is replaced by the stability associated with the region $ROI_p$ in the image $Im_{t'}$. This is done for each of the regions that the image $Im_{t'}$ shares with the image $Im_t$, i.e. two regions that have the same label in the two images. The global stability of the image $Im_{t'}$ is updated, i.e. recalculated, taking account of the updated stabilities associated with the regions that it comprises.

Let $Im_{t'}$ be the current best image that has been acquired at the instant t'. For each region present both in the image $Im_{t'}$ and in the image $Im_t$ acquired at the current instant t, the stability value associated with the region $ROI_m$ in the image $Im_{t'}$ is updated as follows:

$$S_m^{update}(t') = \max(S_p(t), S_m(t'))$$

where $S_p(t)$ is the stability associated with the region $ROI_p$ in the image $Im_t$;

$S_m(t')$ is the stability associated with the region $ROI_m$ in the image $Im_{t'}$; and $S_m^{update}(t')$ is the stability associated with the region $ROI_m$ in the image $Im_{t'}$ after the updating.

The value representing the BestImage stability is therefore updated using, in the equation (Eq. 1), the values $S_m^{update}(t')$. In updating the score account is taken of the value representing the updated BestImage stability.

Figure 4:
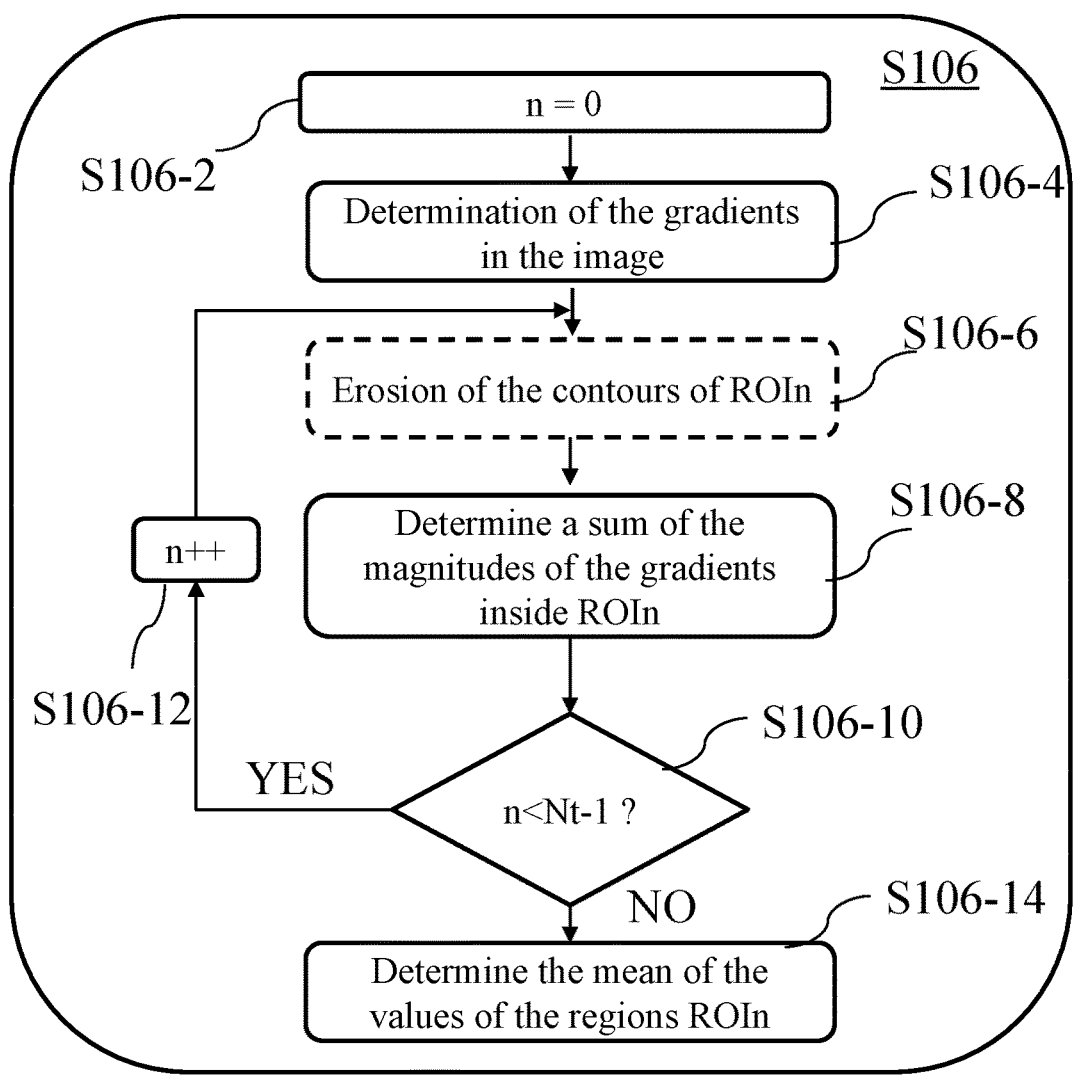
FIG. 4 illustrates schematically an example of performance of a step of determining a value representing a sharpness of an image according to a particular embodiment.

FIG. 4 illustrates schematically an example of performance of the step S106.

The step S106 starts (S106-2) with n=0, by convention.

In a step S106-4, gradients of the image are determined. In a particular embodiment, the horizontal and vertical gradients are determined. In a variant, gradients in the image are determined in directions other than the horizontal and vertical directions. Sobel filters are for example used for determining the horizontal and vertical gradients.

The Gx and Gy matrices below define such Sobel filters:

$$Gx = \begin{pmatrix} -1 & 0 & 1 \\ -2 & 0 & 2 \\ -1 & 0 & 1 \end{pmatrix} \text{ and } Gy = \begin{pmatrix} 1 & 2 & 1 \\ 0 & 0 & 0 \\ -1 & -2 & -1 \end{pmatrix}$$

In an optional step S106-6, the contours of the regions $ROI_n$ are eroded by approximately a factor alpha of the width of the finger using the segments formed by the centre of gravity (Cx, Cy) determined at S104-4 and each of the points of the contour $(xi, yi)_{i=0,m}$ as regression axes. Thus each point of the contour is moved on the axis that connects it to the centre of gravity so that the length of the segment is reduced by r, with r=alpha*l where l is the width of the finger in the image, alpha having for example the value 0.25.

In a step S106-8, a sum Tn of the magnitudes of the gradients on the surface of the region $ROI_n$ is determined. In a variant, the sum of the magnitudes of the gradients on the surface of the region ROI after erosion of the contour is determined. This variant makes it possible to determine the value Tn on a central zone of the region ROI and thus to avoid edge effects. This is because high contrasts between the background and the contour of the finger will cause projecting contours that will increase the sum of the magnitudes of the gradients.

Tn is for example calculated as follows from the Tenengrad function from $ROI_n$:

$$Tn = \sqrt{\sum_{(x,y) \in ROIn} (Gx * Imt(x,y))^2 + (Gy * Imt(x,y))^2}$$

where * is the convolution operator.

Tn is for example calculated as follows from the Tenengrad function from $ROI_n$ after erosion:

$$Tn = \sqrt{\sum_{(x,y) \in Erode(ROIn)} (Gx * Imt(x,y))^2 + (Gy * Imt(x,y))^2}$$

In a step S106-10, n is compared with Nt−1. If n<Nt−1, n is incremented by 1 in a step S106-12. Otherwise the method continues at a step S106-14.

In the step S106-14, a value T representing a sharpness of the image $Im_t$ is determined. It is equal to the mean of the sum values Tn of the regions $ROI_n$ of the image:

$$T = \frac{1}{Nt} \sum_{n=0}^{Nt-1} Tn$$

The method described is advantageously used for accelerating the access control flows in stadiums and for combating fraud and the ticket black market. The individual identifies/registers themself before the event, e.g. at home, by means of the camera of his smartphone, which captures the prints of his fingers. For this purpose, the user positions his hand in front of the lens (with or without movement) of the camera. An image is then selected using the methods described in relation to FIGS. 1 to 4. The image selected will be used for their identification. On arriving at the stadium, the individual is identified by a dedicated print sensor. The dedicated print sensor then checks whether the print captured corresponds to a print in the database. This procedure therefore makes it possible to make the flows of spectators in the stadium fluid, to dispense with paper tickets and thus mitigate any loss of tickets.

The method described makes it possible to improve the performance, by approximately 0.7%, in terms of precision of identification and to reduce the acquisition time by an order of 40%, with a negligible increase in the computing time. Moreover, the method is robust to a change in the image capture module, e.g. to a change of smartphone.

Figure 5:
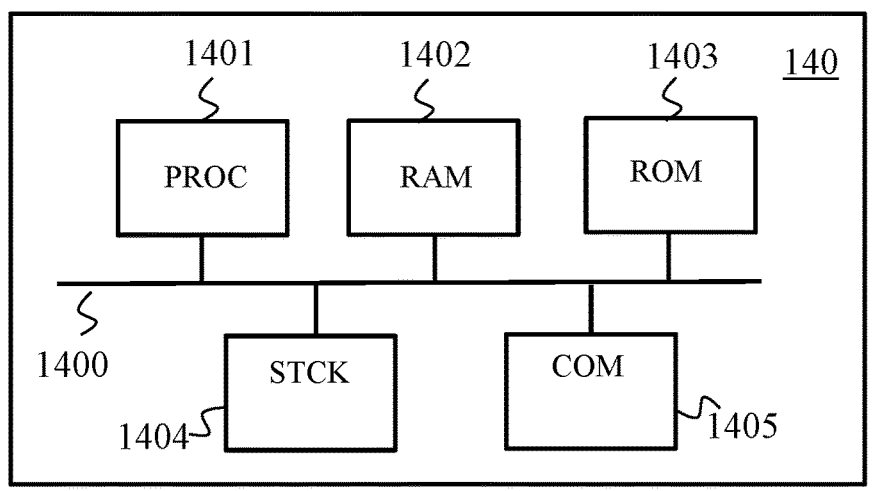
FIG. 5 illustrates schematically an example of hardware architecture of a device for selecting an image of a fingerprint for authentication or identification.

FIG. 5 illustrates schematically an example of a hardware architecture device 140 for selecting an image of at least one fingerprint for authentication or identification. According to the example of hardware architecture shown in FIG. 5, the device 140 then comprises, connected by a communication bus 1400: a processor or CPU (central processing unit) 1401; a random access memory RAM 1402; a read only memory ROM 1403; a storage unit such as a hard disk or such as a storage medium reader, e.g. an SD (Secure Digital) card reader 1404; at least one communication interface 405 enabling the device 140 to send or receive information.

The processor 1401 is capable of executing instructions loaded in the RAM 1402 from the ROM 1403, from an external memory (not shown), from a storage medium (such as an SD card), or from a communication network. When the device 140 is powered up, the processor 1401 is capable of reading instructions from the RAM 1402 and executing them. These instructions form a computer program causing the implementation, by the processor 1401, of all or some of the methods described in relation to FIGS. 1 to 4.

The methods described in relation to FIGS. 1 to 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the device 140 comprises electronic circuitry configured for implementing the methods described in relation to FIGS. 1 to 4.

The invention claimed is:

1. A method for selecting an image of a fingerprint for identifying or authenticating an individual, said image being selected in a sequence of images acquired by an image capture module, comprising:
   a) acquiring an image, referred to as the current image, comprising at least one fingerprint with said image capture module and segmenting said at least one fingerprint;
   b) determining a value representing a stability of said current image from said at least one segmented fingerprint;
   c) determining a value representing a sharpness of said current image from said at least one segmented fingerprint;
   d) determining a score for said current image, said score being a combination of said value representing a stability, of said value representing a sharpness and of a number of segmented fingerprints in said current image;
   e) selecting said current image for identifying or authenticating said individual in the case where said score is higher than a first threshold value, and otherwise storing said current image in memory as the best image in the case where the score thereof is higher than a best score value, said best score value then being made equal to the score of said current image, and repeating steps a) to e), wherein determining a value representing a stability of said current image from said at least one segmented fingerprint comprises:
   for each segmented fingerprint, said fingerprint being segmented in the form of a region, referred to as the current region:
     determining a centre of gravity of said current region;
     determining a stability value of said current region according to a distance between the centre of gravity of said current region and the centre of gravity of at least one region determined in one of the f images preceding said current image timewise, f being an integer representing a number of images;
   determining a mean value of said determined stability values, said value representing a stability of said current image being equal to said mean value determined.

2. The method according to claim 1, wherein determining a stability value of said current region comprises:
   determining a distance between the centre of gravity of said current region and the centre of gravity of at least one determined region in one of the f images preceding said current image timewise, referred to as the preceding region, with which a label is associated;
   associating said label with said current region in the case where said distance is smaller than a second threshold value; and
   associating a new label with said current region otherwise;
   determining the percentage of occurrences in F images preceding said current image of said label, F being an integer representing a number of images, said stability value of said current region being equal to said percentage.

3. The method according to claim 1, wherein determining a stability value of said current region comprises:
   determining a distance between the centre of gravity of said current region and the centre of gravity of at least one determined region in one of the f images preceding said current image timewise, referred to as the preceding region, with which a label is associated;
   determining a first directing vector of said current region and a second directing vector of said preceding region;
   associating said label with said current region in the case where said distance is less than a second threshold value and a scalar product of said first directing vector and of said second directing vector is higher than a third threshold value;
   associating a new label with said current region otherwise;
   determining the percentage of occurrences in F images preceding said current image of said label, F being an integer representing a number of images, said stability value of said current region being equal to said percentage.

4. The method according to claim 2, wherein f=0.2*fps and F=0.8*fps where fps is the number of images per second.

5. The method according to claim 1, wherein determining a value representing the sharpness of said current image from said at least one segmented fingerprint comprises:
   determining gradients in said current image;
   for each segmented fingerprint, said fingerprint being segmented in the form of a region, determining a sum of the magnitudes of the gradients inside said region;
   determining a mean value of said sums determined, said value representing the sharpness of said current image being equal to said mean value determined.

6. The method according to claim 5, wherein each region is eroded prior to said determination of a sum of the magnitudes of the gradients and said determination of a sum of the magnitudes of the gradients comprises determining a sum of the magnitudes of the gradients inside said eroded region.

7. The method according to claim 1, wherein said score for said current image is determined according to the following formula:

$$\text{Score}(Im_t) = \min(TH1, \text{Stability}(Im_t)) * \min(TH2, \text{Sharpness}(Im_t)) * \min(TH3, Nt)$$

where TH1, TH2 and TH3 are threshold values, Stability ($Im_t$) is the stability value of said current image, Sharpness (Imt) is the sharpness value of said current image and Nt is the number of segmented fingerprints in said current image.

8. The method according to claim 1, wherein the step e) further comprises updating said best score value of said image stored in memory as best image taking account of the value representing the stability of said current image;
   and selecting said image stored in memory as best image for identifying and authenticating said individual in the case where said updated best score value is higher than said first threshold value and than said score of said current image.

9. The method according to claim 8, wherein updating said best score value of said image stored in memory as best image taking account of the value representing the stability of said current image comprises, for each region that said best image shares with said current image, replacing the stability associated with said region in said best image with the stability associated with said region in said current image in the case where the stability associated with said region in said current image is greater than the stability associated with said region in said best image and updating said best score value of said best image taking account of said replaced stabilities.

10. A non-transitory storage medium storing instructions for implementing, by a device for selecting an image, the method according to claim 1, when said instructions are executed by a processor of said device for selecting an image.

11. A device for selecting an image of a fingerprint for identifying or authenticating an individual, said selection device comprises an image capture module, said image being selected in a sequence of images acquired by said image capture module, the selection device comprising electronic circuitry configured to:
   a) acquire an image, referred to as the current image, comprising at least one fingerprint with said image capture module and segmenting said at least one fingerprint;
   b) determine a value representing a stability of said current image from said at least one segmented fingerprint;
   c) determine a value representing a sharpness of said current image from said at least one segmented fingerprint;
   d) determine a score for said current image, said score being a combination of said value representing a stability, of said value representing a sharpness and of a number of segmented fingerprints in said current image;
   e) select said current image for identifying or authenticating said individual in the case where said score is higher than a first threshold value, and otherwise store said current image in memory as the best image in the case where the score thereof is higher than a best score value, said best score value then being made equal to the score of said current image, and repeat steps a) to e), wherein determining a value representing a stability of said current image from said at least one segmented fingerprint comprises:
   for each segmented fingerprint, said fingerprint being segmented in the form of a region, referred to as the current region:
      determining a centre of gravity of said current region;
      determining a stability value of said current region according to a distance between the centre of gravity of said current region and the centre of gravity of at least one region determined in one of the f images preceding said current image timewise, f being an integer representing a number of images;
   determining a mean value of said determined stability values, said value representing a stability of said current image being equal to said mean value determined.

* * * * *